United States Patent [19]

Ljubarsky et al.

[11] Patent Number: 4,786,407
[45] Date of Patent: Nov. 22, 1988

[54] PLANT FOR TREATMENT OF SEDIMENT OF NATURAL AND WASTE WATERS

[76] Inventors: Vladlen M. Ljubarsky, ulitsa Miklukho-Maklaya, 29, korpus I, kv. 27; Anatoly I. Fedorov, ulitsa Planernaya, I6, korpus 6, kv. 243, both of Moscow; Nikolai V. Fomin, ulitsa Basseinaya, II3, korpus I, kv. 247, Leningrad; Vladimir F. Didenko, ulitsa Dimitrova, 22, korpus I, kv. II, Leningrad; Boris M. Menin, Vitebsky prospekt, 35, kv. 42, Leningrad; Gennady I. Kravtsov, ulitsa Basseinaya, 70/42, kv. I46, Leningrad; Fedor E. Dovzhko, ulitsa Industrialnaya, 7, kv. 57, Khabarovsk; Vladimir V. Petukhov, ulitsa Pestelya, 25/23, kv. 8; Vera M. Smirnova, prospekt Kosmonavtov, 29, korpus I, kv. 49, both of Leningrad, all of U.S.S.R.

[21] Appl. No.: 153,268
[22] PCT Filed: Apr. 30, 1986
[86] PCT No.: PCT/SU86/00041
§ 371 Date: Dec. 23, 1987
§ 102(e) Date: Dec. 23, 1987
[87] PCT Pub. No.: WO87/06573
PCT Pub. Date: Nov. 5, 1987
[51] Int. Cl.[4] ............................................. B01D 9/04
[52] U.S, Cl. .................................... 210/178; 62/540; 62/545; 210/179; 210/181; 210/185; 210/187
[58] Field of Search .............. 210/774, 751, 175, 177, 210/178, 179, 181, 182, 187, 521, 523, 184–186; 62/542, 540, 56, 532, 538, 539, 543–545

[56] References Cited

U.S. PATENT DOCUMENTS

| | | | |
|---|---|---|---|
| 3,880,756 | 4/1975 | Raineri | 210/774 |
| 4,018,682 | 4/1977 | Boyer | 210/774 |
| 4,124,405 | 11/1978 | Quienot | 210/751 |
| 4,229,295 | 10/1980 | Krofchak | 210/751 |
| 4,448,689 | 5/1984 | von Nordenskjoid | 210/521 |
| 4,505,728 | 3/1985 | Cheng et al. | 210/774 |

FOREIGN PATENT DOCUMENTS

| | | |
|---|---|---|
| 59-7519 | 2/1984 | Japan. |
| 59-8198 | 2/1984 | Japan. |
| 582211 | 11/1977 | U.S.S.R.. |
| 704643 | 12/1979 | U.S.S.R.. |
| 1104115 | 7/1984 | U.S.S.R.. |

OTHER PUBLICATIONS

"Basic Processes and Apparatus of Chemical Technology", by N. I. Gelperin, Khimia Publishers, Moscow, 1981, p. 331, FIG. VII-9.
"Stepless V-belt and Friction Drives (Variable Speed Drives)", by B. A. Pronin et al., Machinostroyeniye Publishers, 1980, Moscow, pp. 19 and 20, FIG. 3($a$–$b$).
"Fundamentals of Liquid Spraying Techniques", by D. G. Pazhi et al, Khimia Publishers, Moscow, 1984, p. 72, FIG. 4.1($b$).
"Manufacture and Employment of Ice", by V. A. Bobkov, Food Industry Publishers, Moscow, 1977, p. 156, FIG. 80, para. 2.

Primary Examiner—Frank Sever
Attorney, Agent, or Firm—Fleit, Jacobson, Cohn & Price

[57] ABSTRACT

A plant for treatment of sediment of natural and waste waters comprises a crystallizer (1), a melter (2), a condensing heat exchanger (4), a compression refrigerating unit (3) communicating with the crystallizer (1) and the melter (2) which is in communication with the sediment dehydration apparatus (5). The evaporator (8) of a crystallizer (1) has two cylinders (9). The plant comprises a refrigerant feed unit (13) and a refrigerant discharge unit (15), a planetary gear drive, a sediment application unit (17) and a sediment removal unit (19). The crystallizer (1) has a recirculation station (6). The sediment application unit (17) is made in the form of pour-on nozzles (18). Installed between the cylinders (9), at an angle to their walls with a clearance ($\delta_1$, $\delta_2$) are screens (12). The sediment removal unit (19) has at least two cutting tools (20) with flexible pick-ups. The refrigerant feed unit (13) has a perforated header (14) while the planetary gear drive has a variable speed drive (23). The melter (2) has sprinkling nozzles (30) and a device for collection and removal of sediment solids while the condensing heat exchanger (4) is located outside of melter (2).

4 Claims, 2 Drawing Sheets

PLANT FOR TREATMENT OF SEDIMENT OF NATURAL AND WASTE WATERS

TECHNICAL FIELD

The present invention relates to treatment of sediment formed in purification of natural and waste waters and more particularly, to a plant for treatment of sediment of natural and waste waters.

BACKGROUND OF THE INVENTION

Known in the prior art is a freezing-and-thawing plant (the USSR Inventor's Certificate No. 704643 Class C 02 C 3/00, published 1979) comprising a crystallizer in the form of a horizontal cylinder provided with a sediment removal unit having a knife, and a melter which comprises a thawing tank with an agitator and a condensing heat exchanger in the capacity of a water heater.

The known plant is insufficiently reliable in operation due to the employment of gland seals on the cylinder shaft, nonuniform distribution of refrigerant over the internal surface of the cylinder, incomplete settling of the solids contained in the sediment due to turbulization of water by the agitator.

Another prior art plant for treating the sediment of natural and waste waters (the USSR Inventor's Certificate No. 582211, Class C 02 3/00, published 1977) comprises a crystallizer, a melter arranged right under said crystallizer, a condensing heat exchanger, a compression refrigerating unit communicating with the crystallizer and, via the condensing heat exchanger, with the melter which latter is in communication with the sediment dehydration apparatus. The crystallizer incorporates an evaporator comprising two coaxially-arranged vertical cylinders interconnected at the ends by a base and a cover. The crystallizer comprises a unit for application of sediment to the vertical walls of the evaporator cylinders, said walls functioning as heat-exchanging surfaces. The sediment application unit is provided with chambers which have sealing elements. The unit also contains a sediment removal unit provided with one cutting tool in the form of a knife or a cutter. The sediment application and removal units are secured on the drive shaft and rotate on a planetary principle relative to the heat-exchanging surfaces of the evaporator cylinders. The crystallizer evaporator incorporates a refrigerant feed unit and a refrigerant discharge unit. The sediment freezes on the heat-exchanging surfaces due to boiling of refrigerant between the cylinders. The melter of the plant comprises a vessel with a conical bottom, said vessel having a cylindrical partition inside whose external surface carries a tubular condensing heat exchanger.

The known plant is little reliable in operation through the following reasons. Owing to its thicotropic properties, the sediment contained in the chamber of the sediment application unit partly restores its structure which was disturbed in the course of transportation. The structure-restoring process in the sediment goes on nonuniformly which results in formation of flakes of variable viscosity and size. Therefore, the heat-exchanging surface becomes coated with an irregular layer of frozen sediment which causes nonuniform contact of chamber sealing elements and leakage of sediment from said chambers. If the sediment application unit stops for some reason, the chambers freeze to the heat-exchanging surfaces of the evaporator cylinders. The knife or cutter is installed at a certain distance from the heat-exchanging surfaces so that part of the frozen sediment fails to be cut off. This results in the increased local thermal resistance, incomplete freezing of the next sediment layer and nonuniform contact of the chambers of the sediment application unit with the heat-exchanging surfaces.

Improvement of the water-yielding properties of sediment is achieved only under preset thermal conditions in the course of freezing. The process of heat exchange is influenced by thermal hydrodynamic parameters which latter depend on the total heat-transfer coefficient, the coefficient of convective heat transfer from the refrigerant and refrigerant, and by the temperature of sediment and refrigerant. Deviation of these parameters from optimum values impairs the reliability of operation of the entire plant. In the plant of the present invention the thermal hydrodynamic parameters may deviate due to the following reasons. The evaporator becomes operational only being fully filled with liquid refrigerant. A considerable height of the column of liquid refrigerant influences the values of coefficients of heat transfer from refrigerant to the cylinder wall said values being local throughout the height of the evaporator and thus causes different intensity of heat exchange between the sediment and refrigerant. Different coefficients of convective heat transfer are also observed during refrigerant feed to a certain portion of the evaporator since its further spreading inside the interwall space of the evaporator proceeds with a varying intensity. The change in the coefficient of convective heat transfer from the side of refrigerant impairs the reliability of the plant. The temperature of the sourse sediment may vary within considerable limits even during a day which changes the conditions of heat exchange and thermal load of the evaporator. Violation of the heat exchange conditions and coefficient of convective heat transfer from the side of the sediment reduces the efficiency of sediment freezing which likewise impairs the reliability of the plan operation.

The plant of the present invention has no provision for changing the freezing conditions, the rotation speed of the sediment application and removal units which again reduces the plant's reliability. These changes are required since the sediment properties are not stable and depend on the quality of source water, season and water treatment technology.

This plant fails to provide for time coordination of the freezing and thawing processes due to possible accumulation of the frozen sediment on the surface of water in the melter. The transfer of heat from refrigerant to sediment in the melter proceeds with a convective heat transfer coefficient from the side of sediment not exceeding 100 W/m$^2 \cdot$°C., therefore the condensing heat exchanger should have an extended heat-exchanging surface which complicates the precipitation of solids from the sediment. Accumulation of solids from the sediment on the walls of the conical bottom of the vessel interferes with operation both of the melter and the sediment dehydration apparatus which tells on the reliability of the whole plant.

SUMMARY OF THE INVENTION

The main object of the invention resides in providing a plant for treating the sediment of natural and waste waters which would permit freezing and thawing the sediment under the thermal conditions which increase the water-yielding properties of sediment and thus would improve reliability of said plant operation.

This object is achieved by providing a plant for treating the sediment of natural and waste waters comprising a crystallizer, a melter located right under the crystallizer, a condensing heat exchanger, a compression refrigerating unit communicating with the crystallizer and, via the condensing heat exchanger, with the melter which is in communication with the sediment dehydration apparatus, a crystallizer evaporator incorporating two coaxially-arranged vertical cylinders interconnected at the ends by a base and a cover, a refrigerant feed unit and refrigerant discharge unit, a planetary drive whose shaft carries a sediment application unit and a sediment removal unit, where in, according to the invention, the crystallizer incorporates a recirculation station linked with the sediment application unit made in the form of pour-on nozzles installed under the evaporator cover, wherein there are screens installed with a clearance between the evaporator cylinders at an angle to their vertical walls, and the sediment removal unit has at least two cutting tools with flexible pick-ups, said tools being arranged one under the other and offset in the direction opposite to rotation of the sediment application unit, the refrigerant feed unit has a circular perforated header installed at the evaporator base, the planetary gear drive incorporates a variable speed drive, the melter has sprinkling nozzles and a device for collection and removal of the sediment solids while the condensing heat exchanger arranged outside of the melter is communicates with the melter and sprinkling nozzles via a pump.

It is expedient that, in order to maintain a constant displacement of cutting tools from each other the plant should have a heat exchanger cut in between the recirculation station and the sediment application unit and communicating with the melter.

It is preferable that the clearance between the vertical wall of the cylinder and the corresponding screen at the evaporator base should be selected from 1.0 to 1.5 mm and the clearance between the vertical wall of the cylinder and the corresponding screen at the evaporator cover should be selected from 5.5 to 7.0 mm.

It is likewise expedient that the device for collection and removal of solids from the sediment should have the form of an auger with a drive and wash-off nozzles installed on the melter bottom.

The provision in the plant for treatment of sediment of natural and waste waters of the recirculation station, pour-on nozzles, screens, at least two cutting tools with flexible pick-ups, a circular perforated header, a variable speed drive, sprinkling nozzles and a device for collection and removal of solids from the sediment in the melter permits maintaining dependable performance of the plant under preset thermal conditions in the process of freezing and thawing of the sediment.

Constructing the sediment application unit in the form of pour-on nozzles permits the sediment to be applied to the heat-exchanging surfaces of the evaporator cylinders in such a way as to prevent accumulation of layered deposits, jet flows and their crossing on the surface and to rule out spraying of sediment in the air.

The provision of the recirculation station permits returning the liquid sediment dripping down from the heat exchanging surfaces of the evaporator cylinders, reducing the viscosity of sediment and delivering it to the pour-on nozzles.

To achieve a constant convective heat transfer coefficient from the side of refrigerant throughout the height of the evaporator the refrigerant boils between the wall and the screen. This produces a bubble of gaseous refrigerant which starts restricted motion upward under the effect of gravitational and bouyancy forces which act in the direction of increasing wall-to-screen clearance due to a constant growth of the bubble. The moving bubble functions as a piston pushing upward the liquid refrigerant. Approaching the evaporator cover, the bubbles burst and the entrained liquid refrigerant is thrown down into the space between two screen, subsequently flowing again behind the screens to the cylinder walls.

To ensure restricted motion of the bubble, a clearance $\delta_1$ between the wall and the screen at the evaporator base should be:

$$\delta_1 = 0.4\, d\, (P/P_1) - 0.46,$$

where:
  d is diameter of refrigerant bubble at the moment of its breaking off from the heat exchanging surface at a pressure $P_2 = 0.3\, P_1$,
  $P_1$ is critical pressure of refrigerant;
  P is pressure corresponding to the present boiling temperature of refrigerant in the evaporator.

A clearance $\delta_2$ between the wall and screen at the evaporator cover depends on the critical diameter of the bubble. On reaching the critical diameter the bubble and the clearance $\delta_2$ is equal to:

$$\delta_2 = 5 - 6\, \delta_1.$$

For most commonly used refrigerants (ammonia, khladon-12, khladon-22) the clearance is:

$$\delta_1 = 1.0\ mm - 1.5\ mm;$$

$$\delta_2 = 5.5\ mm - 7.0\ mm.$$

When the clearance $\delta_1$ is smaller than 1.0 mm, the liquid khladon enters the wall zone in insufficient quantities and there develop large spaces containing vapourized refrigerant which reduces the duration of heat exchange between the liquid and the cylinder wall together with a reduction of the coefficient of convective heat transfer from the side of refrigerant. If the clearance $\delta_1$ is larger than 1.5 mm the above-described vapour-liquid motion of refrigerant is not observed.

A reduction of a clearance $\delta$ at the evaporator cover from the suggested value $\delta_2 = 5.5$ mm results in distortion of the gaseous refrigerant bubble and increases its surface of contact with the wall and, consequently, it diminishes reliability of the evaporator and the plant as a whole.

If the clearance $\delta_2$ exceeds 7.0 mm, the bubbles will burst before reaching the evaporator cover; hence, there will be no throwout of liquid refrigerant from the wall zone which will disturb the process of heat exchange.

To ensure constant hydrodynamic conditions of delivery of liquid refrigerant behind the screens to the walls at the evaporator base there is a circular perforated header installed between the cylinders and communicating with the refrigerant feed unit. Arrangement of the screens at a certain distance from the walls of evaporator cylinders and circular perforated header ensures a constant coefficient of convective heat transfer from the side of refrigerant over the entire heat-exchanging surface of the cylinder walls which steps up the reliability of operation of the plant for treatment of sediment of natural and waste waters. The steady conditions of the vapour-liquid motion of refrigerant between the wall and the screen depends on the temperature of entering liquid sediment and on the condition of said sediment before its removal from the heat-exchanging surface. The temperature of liquid sediment is kept constant and close to the cryoscopic temperature by the heat exchanger supplied with water from the melter. This makes it possible to rule out the daily differences of sediment temperature thereby enhancing the reliability of the plant operation.

Owing to the motion of the pour-on nozzles the sediment is applied to the heat-exchanging surface over a curved line whose curvature depends on the rotation speed of the sediment application unit, height of evaporator, quality of sediment. Therefore, the use of one cutting tool along the height of the evaporator results either in underfreezing or overfreezing of the sediment which impairs the reliability of the plant operation. Bearing in mind the curvilinearity of the sediment freezing line along the height of the evaporator cylinders, the sediment removal unit shall be able to remove sediment from the heat-exchanging surface also along the curved line. With this purpose in view the sediment removal unit is provided with at least two cutting tools installed one under the other with a certain displacement. Such an arrangement of the cutting tools with a certain displacement enables the sediment to be removed along a curved line. The influence of sediment temperature on the curvature of the line is ruled out and the unchanged displacement of the cutting tools is ensured by the heat exchanger. In case of sewage treatment the sediment application line and the freezing line have but a small curvature. In this case there should be two cutting tools offset by not less than 20 mm from each other. If they are displaced by less than 20 mm this will tell on the quality of the produced sediment. A displacement exceeding 200 mm results in continuous overcooling of the frozen sediment which reduces the delivery of heat to the refrigerant at this portion of the evaporator cylinders, interferes with steady boiling of refrigerant and, as a consequence, impairs the reliability of plant operation. Therefore, arrangement of at least two cutting tools with flexible pick-ups at a preset displacement from each other promotes the reliability of the plant operation. The flexible pick-up is arranged directly after the cutting tool so that it is in uniform contact with the heat-exchanging surface. The flexible pick-up cleans the heat-exchanging surface from the remaining pieces of the frozen sediment thereby ensuring uniform application of the next layer of liquid sediment.

Using the variable speed drive installed on the planetary gear drive and taking in account the properties of the handled sediment, the freezing conditions are selected so as to ensure a maximum increase of the water-yielding properties of the sediment and thus to improve the reliability of plant operation.

Steady functioning of the melting pot is achieved by arranging the condensing heat exchanger beyond the limits of the melter and by equipping said melter with sprinkling nozzles for intensifying the process of melting and improving the reliability of the plant operation. The provision of sprinkling nozzles increases noticeably the plant's output which, in turn, calls for continuous removal of solids of the sediment from the melter into the sediment dehydration apparatus. With this purpose in view there is a device for collecting and removing the sediment solids made in the form of an auger with a drive and wash-off nozzles installed on the melter bottom.

The provision in the disclosed plant of the recirculating station, pour-on nozzles, screens, at least two cutting tools with flexible pick-ups, a circular perforated header, heat exchanger and variable speed drive makes it possible to freeze the sediment at a constant heat transfer coefficient over the entire surface of the cylinders. This permits dehydration of the treated sediment to a humidity of 60 to 75%.

Equipping the melter with wash-off, sprinkling nozzles, pump, auger and condensing heat exchanger installed outside of the melter permits thawing the sediment after freezing at preset thermal conditions.

The plant of the present invention for treatment of sediment of natural and waste waters ensures all-round automatization of treatment of sediment of any quality to a desired humidity thereby reducing operational costs, improving the technical-and-economic standards of the sediment treatment process and improving these standards for the entire water purification technology. Besides, the use of the disclosed plant for treatment of sediment of natural and waste waters reduces the production floor areas. Keeping the thermal loads in the plant elements within desired limits ensures effective treatment of sediment and improves its water-yielding properties thus enabling its dehydration to be carried out on simplest filtering apparatus.

BRIEF DESCRIPTION OF THE DRAWINGS

Now the invention will be dealt with in detail by way of example with reference to the accompanying drawings in which.

BEST MODE OF CARRYING OUT THE INVENTION

Figure 1:
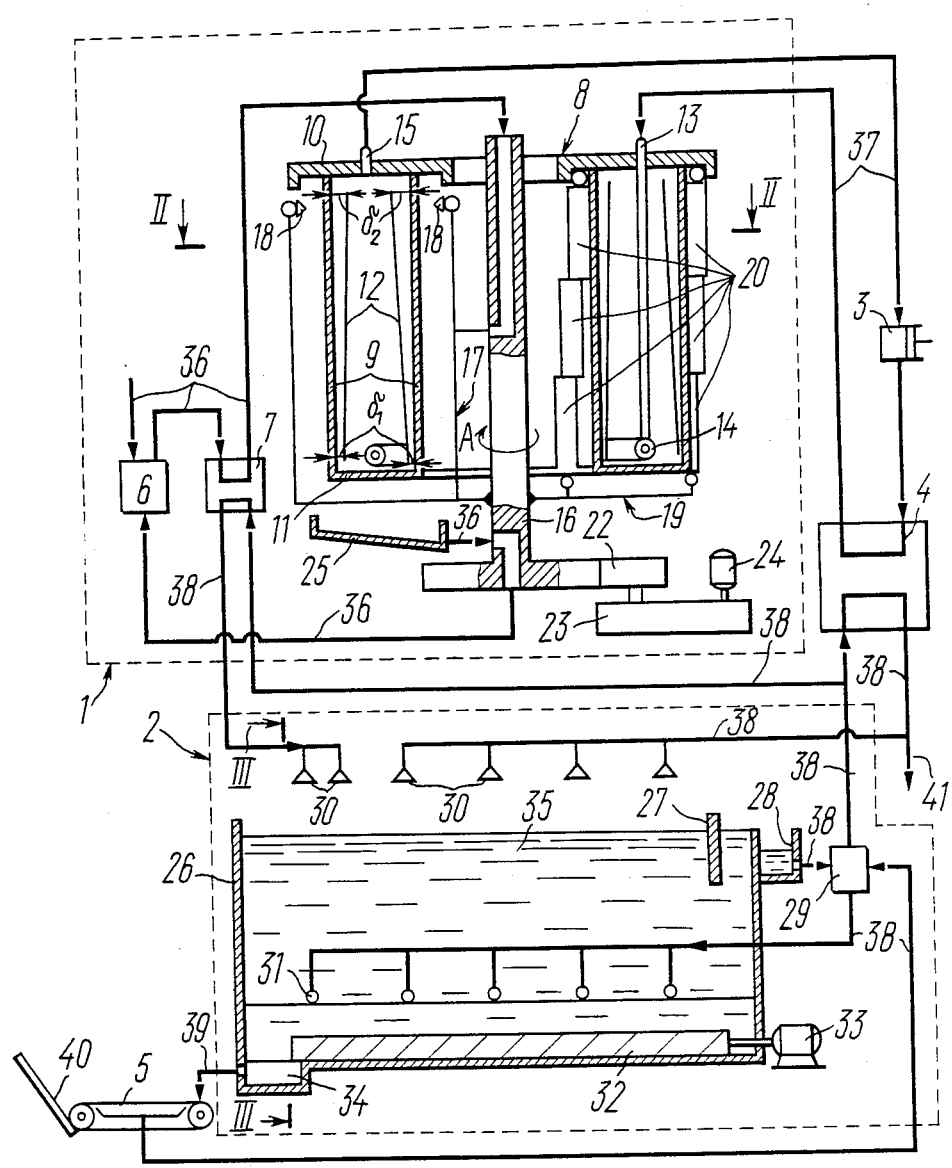
FIG.1 is a general view of the natural and waste water sediment treatment plant according to the invention.

The plant for treatment of natural and waste water sediment comprises a crystallizer 1 (FIG. 1), a melter 2 arranged right under the crystallizer 1, a compression refrigerating unit 3 communicating with the crystallizer 1 and, via a condensing heat exchanger 4, with the melter 2 which, in turn, is in communication with a sediment dehydration apparatus 5. The crystallizer 1 is provided with a recirculation station 5. The plant incorporates a heat exchanger 7 communicating with the melter 2. A recirculating station 6 may be designed along the commonly known lines (V. A. Bobkov "Manufacture and Employment of Ice" published 1977, "Food Industry" Publishers, Moscow, p. 156, FIG. 80, para 2). The heat exchanger 7 may be of a tubular type (N. I. Gelperin "Basic Processes and Apparatus of Chemical Technology" publ. 1981, "Khimia" Publishers, Moscow, page 331, FIG. VII-9).

An evaporator 8 comprises two coaxially-arranged vertical cylinders 9 joined to each other at the ends by a cover 10 and a base 11. Installed between the cylinders 9 inclined to their vertical walls are screens 12 with a clearance $\delta_1$ between the vertical wall and the corresponding screen 12 at the base 11 of the evaporator 8, said clearance varying from 1.0 to 1.5 mm. A clearance $\delta_2$ between the vertical wall and the corresponding screen 12 at the cover 10 of the evaporator 8 varies from 5.5 to 7.0 mm. Secured on the cover 10 are a refrigerant feed unit 13 with a circular perforated header 14 installed at the base 11 of the evaporator 8, and a refrigerant discharge unit 15. A sediment application unit 17 mounted on a shaft 16 has two pour-on nozzles 18 installed under the cover 10 of the evaporator 8, and a sediment removal unit 19 which has three cutting tools 20 with flexible pick-ups 21 (FIG. 2) on each heat-exchanging surface on which the sediment is frozen.

Figure 2:
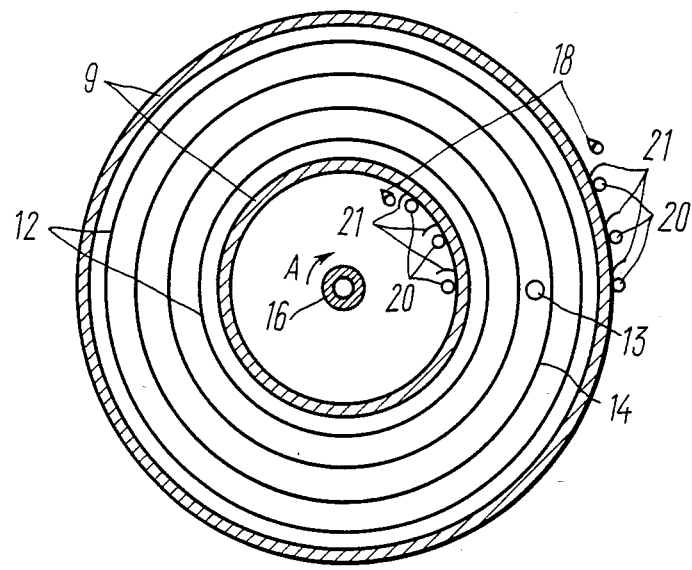
FIG. 2 is the plants evaporator, section along line II—II in FIG. 1 according to the invention.

The relative arrangement of the sediment application unit 17 (FIG. 1) and the sediment removal unit 19 is shown in the figure nominally for better lucidity. The pour-on nozzles 18 of the sediment application unit 17 are located behind the flexible pick-ups 21 (FIG. 2).

The planetary rotation drive 16 (FIG. 1) comprises a driving wheel 22, a variable speed drive 23 and an electric motor 24. It is also possible to use a stepless variable speed drive 23 with gradually changing speed of the driving wheel 22 (B. A. Pronin, G. A. Revkov "Stepless V-belt and friction drives (variable speed drives)" published 1980, "Machinostroyeniye" Publishers, Moscow, p. 20, FIG. 3(a-b), p. 19).

The use is practicable of the slotted pour-on nozzles 18 (D. G. Pazhi, V. S. Galustov "Fundamentals of liquid spraying techniques" published 1984, "Khimia", Publishers, Moscow, p. 72,FIG. 4.1(b)).

Installed under the pour-on nozzles 18 in the evaporator 8 is a collector 25 secured on the shaft 16. The cutting tools 20 are offset from each other in the direction opposite to rotation of the sediment application unit 17. The direction of rotation of the sediment application unit 17 is shown in the figure by arrow A. The recirculation station 6 is in communication with the sediment application unit 17 via the heat exchanger 7.

The melter 2 has a tank 26 comprising a partition 27, a water-discharge trough 28 communicating with a centrifugal pump 29. The pump 29 communicates with sprinkling nozzles 30 through the heat exchanger 7 and the condensing heat exchanger 4. The plant incorporates a device for collection and removal of sediment solids, made in the form of wash-off nozzles 31 and a auger 32 with a drive 33. The pump 29 is in communication with wash-off nozzles 31 installed on the bottom of the tank 26 of the melter 2. The auger 32 with the drive 33 and a pit 34 are also installed on said bottom. The tank 26 of the melter 2 contains a thawed sediment 35.

The plant is provided with pipes 36 for carrying the sediment, refrigerant pipelines 37, water pipelines 38, a pipeline 39 for transportation of sediment solids, a conveyor 40 for the dehydrated sediment and a pipeline 41 for discharging water into sewerage (the sewerage is not shown in the figure).

Figure 3:
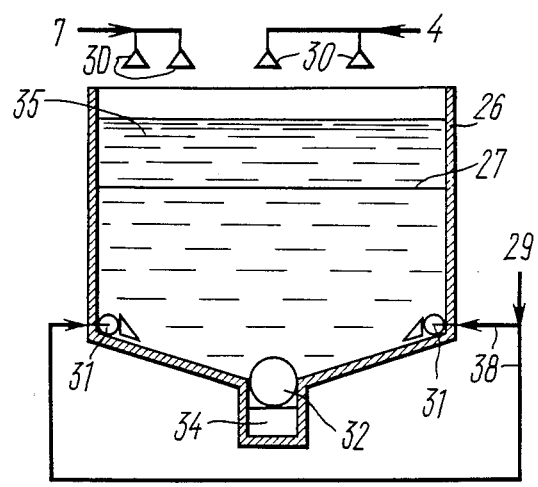
FIG. 3 is the metter of the plant, section along line III—III in FIG. 1 according to the invention.

FIG. 3 shows the location of the partition 27, washoff nozzles 31, the auger 32 and the pit 34 in the tank 26.

The plant of the present invention functions as follows. The treated sediment flows through the sediment pipeline 36 (FIG. 1) from the vessel (not shown in the figure) into the recirculation station 6 and thence, through a recess in the planetary rotation drive shaft 16 into the sediment application unit 17 and pour-on nozzles 18 located at the cover 10. To maintain the constant temperature of the sediment approaching the cryoscopic temperature, the sediment may be forced after the recirculation station 6 into the heat exchanger 7 where it is cooled due to heat exchange with the water delivered from the melter 2 via the pump 29 and the pipeline 38. Then the sediment enters the sediment application unit 17 and the pour-on nozzles 18. During planetary rotation of the sediment application unit 17 with relation to the cylinders 9, the sediment discharged from the pour-on nozzles 18 is applied in a thin uniform layer to the heat-exchanging surfaces of the cylinders 9. The dripping-down surplus sediment is accumulated in the collector 25 and is taken back into the recirculation station 6 through the pipeline 36. The sediment gets frozen due to heat exchange with the boiling refrigerant contained between the cylinders 9 and the screens 12 where it comes from the perforated header 14 of the refrigerant feed unit 13. The refrigerant vapours generated in the course of boiling enter the refrigerant discharge unit 15 and flow further into the compression refrigerating unit 3. The vapourous refrigerant compressed in the compression refrigerating unit 3 is condensed in the condensing heat exchanger 4. Then the liquid refrigerant enters the refrigerant feed unit 13. The refrigerant is transported through the pipelines 37. The sediment frozen on the cylinders 9 is removed by the cutting tools 20 which are superposed one above the other with a displacement in the direction opposite to rotation of the sediment application unit 17. Secured after each cutting tool 20 is the flexible pick-up 21 (FIG. 2) which cleans fully the heat-exchanging surface of the cylinders 9 (FIG. 1) from frozen sediment. The cut-off sediment falls into the tank 26 of the melter 2 where said sediment thaws due to direct heat exchange with water distributed uniformly by the sprinkling nozzles 30. In the course of gravitational settling in the tank 26 the thawed sediment 35 is divided into water and solids. From the zone formed by the partition 27, water flows into the water discharge trough 28 whereform it passes through the pipeline 38 into the pump 29. The bulk of water flows for heating into the condensing heat exchanger 4 and the heat exchanger 7 through the pipelines 38. In the condensing heat exchanger 4 the water is heated by the heat of condensation of the vaporous refrigerant. In the heat exchanger 7 the water is heated due to cooling of the sediment delivered from the recirculation station 6 into the evaporator 8. Heated in the condensing heat exchanger 4 and the heat exchanger 7, the water flows through the pipeline 38 into the sprinkling nozzles 30. The surplus water is thrown through the pipeline 41 into the sewerage.

The solids contained in the sediment settle on the bottom of the tank 26 and are removed by the device for collection and removal of the sediment solids into the sediment dehydration apparatus 5. To enhance reliability of operation, it is expedient that the solids of the sediment should be removed by means of the auger 32. The solids are directed to said auger 32 by the water delivered by the pump 29 into the wash-off nozzles 31 and then are taken by said auger into the pit 34. From the pit 34 the sediment solids move together with a small amount of water through the pipeline 39 into the sediment dehydration apparatus 5. Subsequently, the dehydrated sediment is taken out of the plant by the conveyor 40 while the filtered water flows through the pipeline 38 into the pump 29.

Owing to the provision in the plant of the recirculation station 6, the heat exchanger 7, the screens 12, the perforated header 14, the pour-on nozzles 30, the cutting tools 20 offset from each other and fitted with the flexible pick-ups 21, the variable speed drive 23, the pump 29, the sprinkling nozzles 30, the wash-off nozzles 31, the auger 32, it becomes possible to carry out the process of freezing and thawing of the sediment under the desired thermal conditions which enhances the reliability of both individual units and of the plant as a whole.

Thus, the plant of the present invention for treating the sediment of natural and waste waters ensures dehydration of sediment to the preset parameters and features a high operational reliability.

INDUSTRIAL APPLICABILITY

The present invention can be utilized for desalination of salty waters and concentrated impurities in solutions. It can also prove useful in treating the sediment produced during water purification in public services and many branches of industry and agriculture.

We claim:

1. A plant for treatment of sediment of natural and waste waters comprising a crystallizer (1), a melter (2) located right under the crystallizer (1), a condensing heat exchanger (4), a compression refrigerating unit (3) communicating with the crystallizer (1) and, via the condensing heat exchanger (4), with the melter (2) communicating with a sediment dehydration apparatus (5), an evaporator (8) of the crystallizer (1) having two coaxially-arranged vertical cylinders (9) joined at the ends by a base (11) and a cover (10), a refrigerant feed unit (13) and a refrigerant discharge unit (15), a planetary gear drive whose shaft (16) carries a sediment application unit (17) and a sediment removal unit (19) characterized in that the crystallizer (1) has the recirculation station (6) communicated with the sediment application unit (17) made in the form of pour-on nozzles (18) installed under the cover (10) of the evaporator (8); installed between the cylinders (9) of the evaporator (8), at an angle to their vertical walls with clearances ($\delta_1$, $\delta_2$) are the screens (12) while the sediment removal unit (19) is provided with at least two cutting tools (20) with the flexible pick-ups (21), said tools being arranged one under the other and offset in the direction opposite to the rotation of the sediment application unit (17), the refrigerant feed unit (13) has a perforated circular header (14) installed at the base (11) of the evaporator (8), the planetary gear drive has a variable speed drive (23), the melter (2) has sprinkling nozzles 30 and a device for collection and removal of sediment solids, while the condensing heat exchanger (4) located outside of the melter (2) communicates through the pump (29) with the melter (2) and the sprinkling nozzles (30).

2. A plant for treatment of sediment of natural and waste waters according to claim 1 characterized in that, in order to maintain a constant displacement of the cutting tools (20) relative to each other it has the heat exchanger (7) cut in between the recirculation station (6) and the sediment application unit (17) and communicating with the melter (2).

3. A plant for treatment of sediment of natural and waste waters according to claim 1 characterized in that a clearance ($\delta_1$) between the vertical wall of the cylinder (9) and the corresponding screen (12) at the base (11) of the evaporator (8) is selected within 1.0 and 1.5 mm while a clearance ($\delta_2$) between the vertical wall of the cylinder (9) and the corresponding screen (12) at the cover (10) of the evaporator (8) is selected from 5.5 to 1.0 mm.

4. A plant for treatment of sediment of natural and waste waters according to claim 1 caracterized in that the device for collection and removal of the sediment solids has the form of an auger (32) with a drive (33) and wash-off nozzles (31) installed on the bottom of the melter (2).

* * * * *